June 4, 1968  R. R. MANDY ET AL  3,386,663
ADJUSTABLE NOZZLE SUPPORT FOR WINDSHIELD CLEARING SYSTEMS
Filed April 13, 1966  2 Sheets-Sheet 1
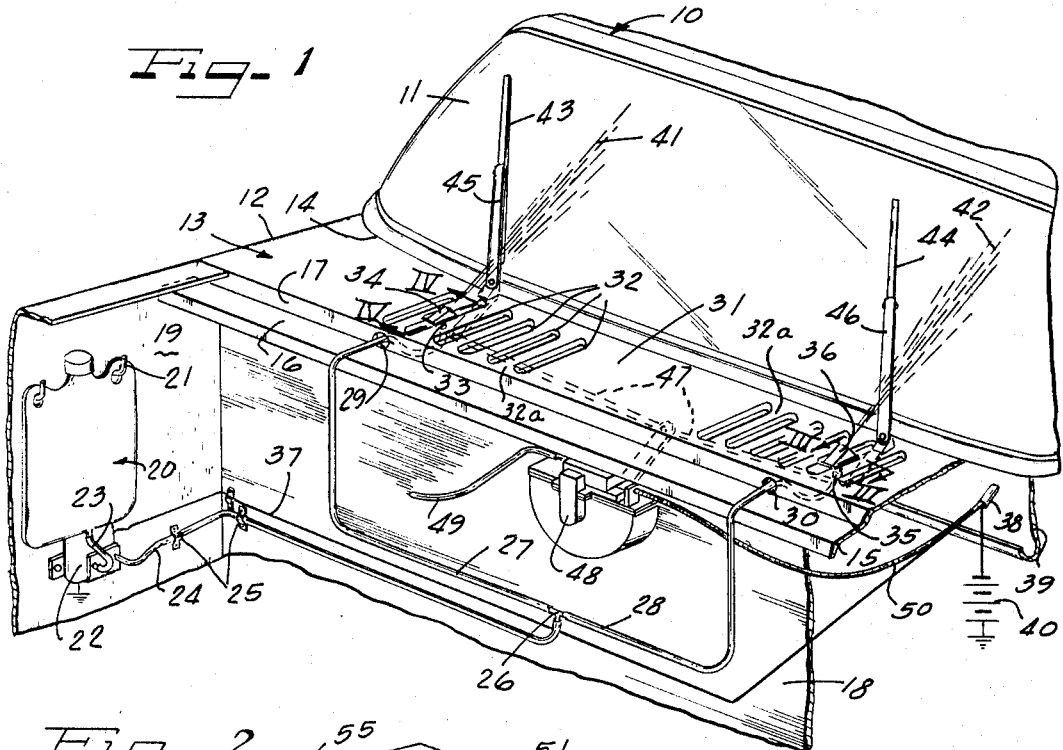
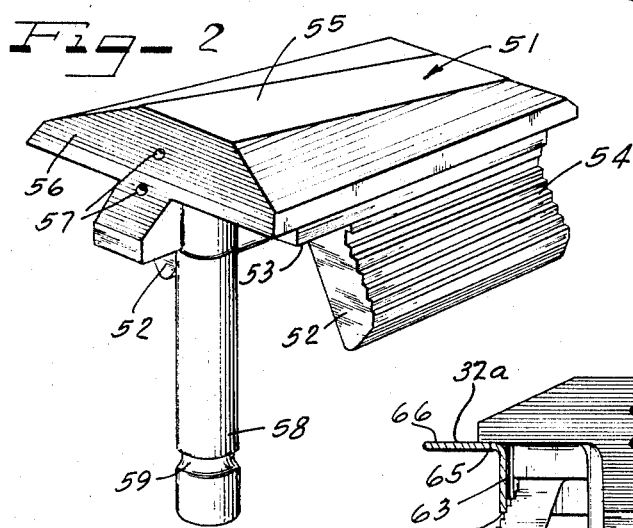
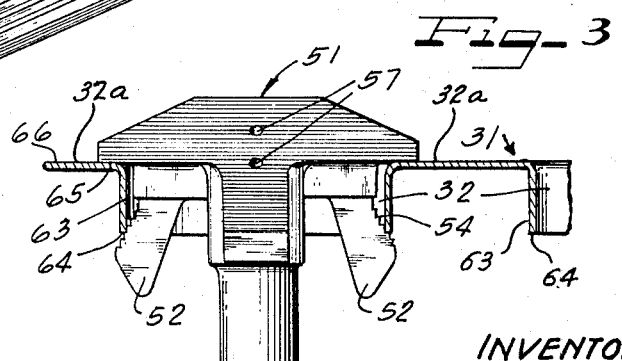
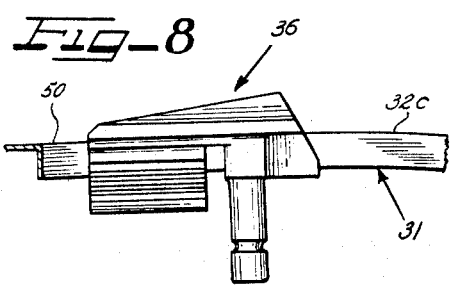
INVENTORS.
ROBERT R. MANDY
EDWIN F. CLEMETT, JR.
ATTORNEY

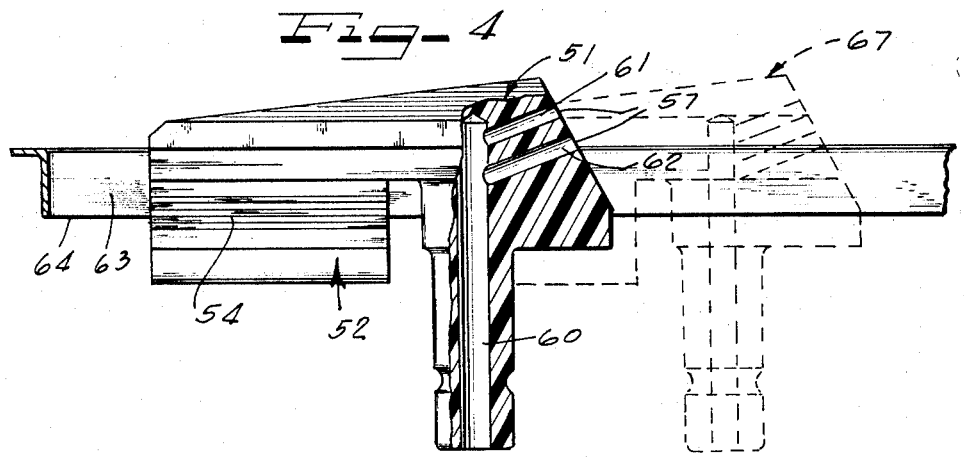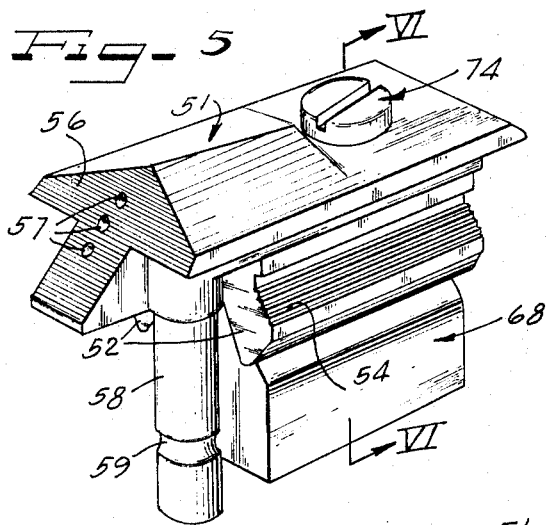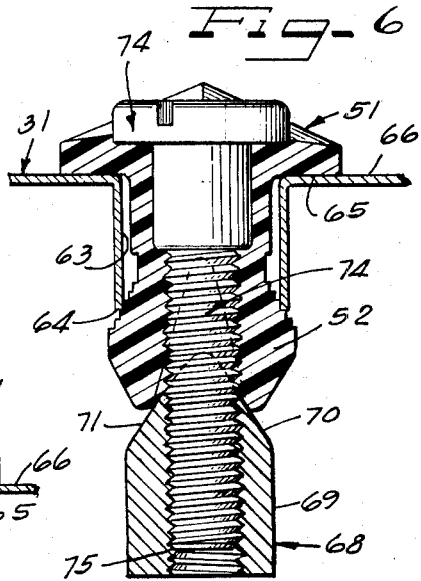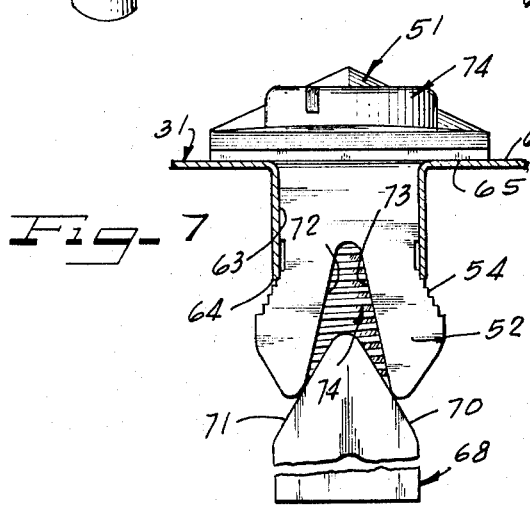
INVENTORS.
ROBERT R. MANDY
EDWIN F. CLEMETT, JR.
ATTORNEY United States Patent Office 3,386,663
Patented June 4, 1968

3,386,663
ADJUSTABLE NOZZLE SUPPORT FOR WINDSHIELD CLEARING SYSTEMS
Robert R. Mandy and Edwin F. Clemett, Jr., Detroit, Mich., assignors to The Delman Company, Cookeville, Tenn., a corporation of Tennessee
Filed Apr. 13, 1966, Ser. No. 542,327
6 Claims. (Cl. 239—284)

ABSTRACT OF THE DISCLOSURE

A windshield washer nozzle having a nozzle head with an integrally formed abutting edge along its lower surface for engaging a vehicle cowl adjacent the opposite sidewall portions of a louvered opening in the cowl. The nozzle is adjustably positioned within the opening for longitudinal movement toward and away from the windshield and is held in an adjusted position by a pair of resilient members formed integral with and extended downwardly in a diverging relation from the lower surface of the nozzle head. On insertion of the resilient members within the louvered opening the abutting edge is engageable with the top surface of the opening sidewall, and the resilient members are frictionally engaged with the opening sidewall. A wedge member may be located between the resilient members to hold them against movement away from the opening sidewall.

This invention relates to a windshield clearing system and more particularly to a windshield washer nozzle having an adjustable support means for being mounted on a vehicle to direct washing fluid onto the windshield of the vehicle.

Standardization of parts is important to the automotive industry in that it reduces the cost of the parts and also reduces the cost of assembly due to the availability of standardized installation techniques.

However, variability of design is also important to the industry as customers require an increasing individuality in their automobile selection. Hence, there is an apparent conflict between standardization of parts and individuality in automotive design.

Windshield washer systems require that a stream of washer fluid be directed at a predetermined impact point on the windshield in order to assure that proper washing action is developed by the wiper blades. However, various models and makes of vehicles employ variously shaped and variously orientated windshields which have made difficult adjustments necessary in applying standardized washer systems.

Accordingly, it is a principal object of this invention to provide a windshield washer system employing a standardized washer nozzle which may be readily adapted to variously designed vehicles.

It is also an object of this invention to provide a spray nozzle for a windshield clearing system which may be readily mounted on variously designed vehicles and which employs adjustable support means for readily altering the impact point of a stream of washer fluid on the windshield.

It is another object of this invention to provide a spray nozzle for a windshield clearing system which is adapted to be mounted in a ventilation slot adjacent the vehicle windshield and which employs means for being slidably adjustable relative to the windshield for varying the point of impact of a stream of washer fluid.

It is another object of this invention to provide an adjustable washer nozzle for a windshield clearing system which has a washer nozzle head and depending winged mounting tabs adapted for slidable support in a ventilation slot adjacent to a vehicle windshield.

It is an additional object of this invention to provide a plastic washer nozzle having a pair of deformable winged tabs each of which is provided with a stepped face for engaging a depending edge of a cowl ventilating slot, and for slidably mounting the nozzle head within the slot for adjusting the impact point of a stream of ejected fluid onto the windshield.

It is also an object of this invention to provide a spray nozzle for a windshield washer system having stepped winged mounting tabs depending from a nozzle head and employing a wedge member and adjustment means for altering the penetration of the wedge between the winged tabs for compressing the tabs to rigidly hold the washer nozzle within a ventilation slot adjacent to the vehicle windshield.

These and other objects, features and advantages of the present invention will be understood in greater detail from the following description and the associated drawings wherein reference numerals are utilized in designating an illustrative embodiment and wherein:

FIG. 1 is a fragmentary perspective view of a motor vehicle showing a windshield clearing system embodying the nozzle and nozzle support assembly of this invention;

FIG. 2 is an enlarged detailed perspective view of the nozzle and nozzle support assembly of FIG. 1 apart from its associated environment;

FIG. 3 is a sectional view of the nozzle support means employed in FIG. 1 showing the nozzle in elevation and illustrating the operation of the winged tabs in mounting the nozzle in an associated ventilation slot;

FIG. 4 is a partially sectioned view of the nozzle of this invention as taken along the lines 4—4 of FIG. 1 and showing the slidable orientation of the nozzle within a ventilation slot;

FIG. 5 is an enlarged perspective view of an alternate form of the nozzle of FIG. 2 showing a wedge means for spreading the winged tabs into firm engagement with the depending edges of an associated ventilation slot;

FIG. 6 is a sectional view taken along the lines 6—6 of FIG. 5 showing the operation of the wedge member in tightening the nozzle head within a ventilation slot and showing the adjustment means for varying the penetration of the wedge between the resilient winged tabs of the nozzle;

FIG. 7 is an elevational view similar to the sectioned view of FIG. 6 for further illustrating the engaged relationship of the winged tab members and of the associated wedge member for securing the tabs within the ventilation slot; and FIG. 8 is a diagrammatic illustration patterned after FIG. 4 showing the mounting of a nozzle on a modified louver section.

Referring to the drawings, this invention concerns generally a windshield washer clearing system such as may be employed in a vehicle 10. The vehicle 10 has an upwardly angled windshield 11 and a body portion 12 which is shown in fragmentary view to illustrate the windshield washer mechanism.

The body portion 12 includes a cowl 13 which extends from the base 14 of the windshield 11 to a forward position at a stepped section 15. The section 15 consists of a tread 16 and a vertical riser 17. As is well understood, the hood of the vehicle 10 may be made to join the cowl 13 at the stepped section 15.

A fire wall 18 depends from the stepped section 15 and extends transversely across the vehicle separating the engine from the passenger areas. The fire wall 18 joins a side wall 19 in forming a typical body structure. The windshield clearing system itself comprises a reservoir or storage tank 20 which is mounted on hooks 21 supported at the side wall 19. A motor and pump assembly 22 is disposed at the base of the reservoir 20 and is utilized to feed the spray nozzle system. The assembly 22 has an input hose 23 connected from the reservoir 20 to the pump 22 and an output hose 24 which is supported at the side wall 19 and at the fire wall 18 by a series of brackets 25.

The output hose 24 is connected to a T fitting 26 which has output lead lines 27 and 28 for dividing the fluid flow within the output line 24 into two separate streams for impacting at the windshield 11. The line 27 extends through an opening 29 formed within the riser 17 of the cowl 13. Likewise, the line 28 extends through an opening 30 formed similarly in the riser 17.

The cowl 13 has a louvered section 31 which includes a plurality of spaced openings 32 and louvers 32a. The openings are formed on opposite sides of a louver 32a and are orientated in a forward to rearward direction in the cowl 13. The washer output lines 27 and 28 each extend to one of the openings 32. The line 27 is connected at a point 33 to a spray nozzle 34 and in a similar manner the line 28 is connected at a point 35 to a spray nozzle 36.

The motor of the motor and pump assembly 22 is connected by an electric cable 37 to a switching means 38 mounted at the dashboard 39 of the vehicle. The battery 40 of the vehicle 10 is shown schematically as the power source for the motor 22. When the switching means 38 is closed, the motor and pump assembly 22 will cause fluid to flow from the reservoir 20 through the output flow lines 24, 27 and 28 to the respective nozzles 34 and 36. Fluid will then be ejected by the nozzles 34 and 36 and impact the windshield at areas such as 41 and 42.

With fluid ejected at the windshield 11, wiper blades 43 and 44 are used to develop a cleansing action as is well understood. The blades 43 and 44 are mounted on wiper arms 45 and 46 and actuated through a series of linkages 47 by an oscillatory type motor 48. The motor 48 is vacuum operated through a vacuum line 49 which may be connected to the intake manifold of the automobile engine and which may be actuated through a Bowden cable 50 shown connected to the dashboard 39 through the general switching means 38. It is apparent, of course, that the motor 48 may be an electric motor connected for operation by the switching means 38.

The washer nozzle indicated by the numerals 34 and 36 in FIG. 1 is shown in more detail in FIG. 2 and consists of a nozzle head 51 and integral resilient winged tabs 52 which depend angularly or in a diverging relation from a lower surface 53 of the nozzle head 51. The outer surfaces of the winged tabs 52 are formed with a plurality of teeth or steps 54 extended longitudinally of the nozzle head 51 and in the direction of the fluid stream ejected from a nozzle. The steps 54 thus extend longitudinally of an opening 32 and when inserted within an opening 32 are firmly engageable with the louvers 32a to each side of an opening 32.

The nozzle head 51 has a rearwardly sloped top surface 55 and an upwardly and forwardly inclined ejection face 56. The face 56 has a pair of vertically spaced discharge orifices 57. Fluid enters the nozzle head 51 through a connection fitting 58 which has a recessed groove 59 to assist in securing a firm connection with the flexible feed lines 27 and 28. As seen in FIG. 4, the fitting 58 has a central passage 60 extending into the head 51, and secondary passages 61 and 62 connected to the central passage 60 and terminating in the discharge orifices 57.

As clearly appears in FIG. 3 each louver 32a is of an inverted U-shape in transverse section so as to include a pair of depending legs or side walls 63 having lower edges 64 and connected by a base section or upper transverse member 66. It is thus seen that the adjacent or facing legs 63 of adjacent louvers 32a constitute the side walls of an opening 32.

In the assembly of nozzles 34 and 36 with a louvered section 31 of the cowl 13, the deformable tabs 52 are pressed toward each other in the direction of the central fitting 58 until they are spaced a distance apart providing for their insertion or reception within a preselected opening or ventilation slot 32. The tabs 52 initially slide downwardly along the side walls 63, and upon extending below the walls 63 spread apart from each other whereby to engage the lower wall edges 64 with the steps or notches 54. This action continues until the portions 65 of the lower surface 54 of a nozzle head 51 are in abutting engagement with the upper sections 66 of adjacent louvers 32a. While the winged tabs 52 may easily be pressed downwardly into the position shown in FIG. 3, the notches or steps 54 prevent their upward egress from the slot 32. The tendency of the tabs 52 to move outwardly to their normal spread apart positions, results in their frictionally engaging the side walls 63 at the steps 64. A nozzle 34 and 36 is thus positively held by the abutment surface 65 and notches 54 against up and down movement relative to a louvered section 31, but is capable of fore and aft movement relative thereto.

Since the length of the washer nozzle is substantially less than the length of the ventilation slots 32, and since the notches 54 formed within the outer surfaces of the winged tabs 52 are oriented horizontal to the upper transverse members 66 of the louvered section 31, the nozzle head 51 may be readily moved forwardly and rearwardly within the associated slot 32 to adjust the point of impact of a stream of washer fluid relative to the windshield 11. Since the slot 32 is initially preselected the nozzle is adjustably transversely and fore and aft of a vehicle to accommodate changes in vehicle models and makes. Also, it is noted that the included angle between the winged tabs 52 as well as the number of notches 54 formed thereon are capable of accommodating various width slots as may be found in different vehicle models or makes. The slidable relationship of the nozzle within the slot 32 to adjust the stream of washer fluid vertically of the windshield is illustrated in FIG. 4 wherein an alternate position of the nozzle head 51 is indicated by the dotted line drawing 67.

To provide for an increased vertical adjustment of the stream of washer fluid relative to the windshield 11 for a given fore and aft movement of the nozzles 34 and 36, the louvers 32a may be longitudinally bowed so as to have either concave or convex upper surfaces. Thus as diagrammatically shown in FIG. 8 a louver 32c has a longitudinally curved convex upper surface 50. As a result on rearward movement of the nozzle 36, toward the longitudinal center of the louver 32c, the nozzle is concurrently moved upwardly and rearwardly to adjust the point of impact of the fluid stream relative to the windshield 11. It is seen, therefore, that the styling of the louvered section 31 may be changed without impairing the fore and aft adjustment of the nozzles or their assembly with the louvers.

Although the washer nozzle as shown in FIGS. 1 through 4 has sufficient resiliency through the spreading of the winged tabs 52 to frictionally maintain a longitudinally set position within the slots 32 of the cowl 13 it is subject to being accidentally thrown out of adjustment by a garage attendant when the vehicle is being washed, polished or the like. To additionally secure the established position of the washer nozzle within an associated slot 32 a metal wedge 68 is provided for spreading the winged tabs 52 of the nozzle head 51 (FIGS. 5, 6 and 7). The wedge member 68 has side walls 69 and a wedge profile formed by the tapered faces 70 and 71 thereof. Also, the winged tab members 52 have an inside profile formed by the tapered walls 72 and 73 which cooperate with the wedge member 68 to more rigidly secure the nozzle within the ventilation slot 32.

The nozzle head 51 is positioned within the slot 32 as in the previous examples. However, the wedge member 68 is fitted internally of the wedge-shaped inside profile of the tabs 52, and the penetration of the wedge member 68 between the tabs 52 is adjusted to compress the tabs against the side walls 63 of the slot 32.

The angle provided by the inside walls 72 and 73 of the winged tabs 52 is less than the angle formed by the walls 70 and 71 of the wedge member 68. Therefore, adjustment or penetration of the wedge member 68 between the winged tabs 52 will cause the tabs to spread and be compressed between the walls 63 of the slot 32. To change the penetration of the wedge member 68 between the winged tabs 52 an adjustment screw 74 is extended vertically of the nozzle head 51 and between the tabs 52 for threadable engagement with a bore 75 formed in the wedge member 68. The wedge member 68 is held against rotation with the screw 74 due to the partial reception of its side walls 70 and 71 between the winged tabs 52. Thus on rotation of the adjustment screw 74 the wedge member 68 is advanced relative to the winged tabs 52 whereby the tabs are spread apart to rigidly secure the washer nozzle within the ventilation slot against fore and aft movement.

The nozzles 34 and 36 are formed of a plastic or like material and may be coated with a metallic plating, or colored to conform with the color of the vehicle on which they are to be used.

It is apparent that various modifications and combinations of the features disclosed and the illustrative embodiments may be accomplished by those versed in the art, but we desire to claim all such modifications and combinations as properly come within the scope of this invention.

We claim:

1. The combination with a vehicle windshield and a vehicle cowl having a louvered section with spaced openings located forwardly of the windshield of:
   (a) a windshield washer nozzle having a nozzle head for conducting fluid from a fluid source to a windshield surface,
   (b) said nozzle head having integrally formed abutment means at the lower end thereof, for contacting the upper surface of said louvered section adjacent opposite sidewall portions of one of said openings, and depending means insertable within said opening,
   (c) said depending means comprising resilient members extended downwardly in a diverging relation from said nozzle head to frictionally engage the lower edges of said side wall portions, and parallel step notches formed longitudinally in the outside surfaces of said depending members,
   (d) said nozzle being adjustably positioned movable within said opening for movement longitudinally of said opening toward and away from the windshield to alter the impact point of a fluid stream ejected by said nozzle onto a windshield surface.

2. The combination in accordance with claim 1 wherein:
   (a) said one opening forms a ventilation slot having depending substantially upright side walls, and
   (b) said resilient members have longitudinally extended grip notches on the outside surfaces thereof for engaging the lower edges of said opposite side wall portions.

3. The combination in accordance with claim 1 including:
   (a) means extendable between said depending means to spread and hold said depending means in rigid contact engagement with the opposite side wall portions of said one opening.

4. In a vehicle having a windshield and a cowl extending forwardly of the winshield, said cowl having a louvered section with slot-like ventilation openings extending longitudinally of the vehicle:
   (a) a windshield washer nozzle for being connected to a washer fluid supply line,
   (b) said nozzle adapted to be positioned within a cowl slot and having a nozzle head disposed for abutting the upper surface of the cowl and resilient deformable wing members depending in a diverged relation from a lower surface of the nozzle head,
   (c) parallel step notches formed longitudinally in the outside surfaces of said wing members for gripping engagement with the lower edges of the side walls of a ventilation opening,
   (d) a wedge receivable between said members and relatively movable therebetween for spreading said wing members into gripping engagement with the lower edges of said side walls, and
   (e) clamp means for adjustably positioning the penetration of said wedge between said wing members for increasing and decreasing the spread of said wing members.

5. A windshield washer nozzle for a vehicle having a windshield and a forwardly extended cowl section formed with a ventilation slot extended longitudinally of the vehicle and having upright side walls, comprising:
   (a) a nozzle head having a pair of transversely spaced lower abutment surfaces engageable with the upper ends of said upright walls,
   (b) a pair of deformable mounting members depended in a diverging relation from the nozzle head, and having upwardly facing surfaces engageable with the lower ends of said upright walls,
   (c) an adjustment wedge positioned between said mounting members having wedging surfaces forming an included angle greater than the included angle between said mounting members, and
   (d) means for adjusting the penetration of said wedge between said mounting members to spread said mounting members into forced bearing engagement with the lower ends of said upright walls.

6. A windshield washer nozzle in accordance with claim 5 wherein:
   (a) said adjustment means comprises a screw threadably received within said wedge and axially motion limited relative to said nozzle head, whereby turning said screw advances said wedge relative to said nozzle head for varying the spread of said mounting members.

References Cited

UNITED STATES PATENTS

| | | | |
|---|---|---|---|
| 2,793,912 | 5/1957 | Krohm | 239—284 X |
| 2,909,957 | 10/1959 | Rapata. | |
| 3,056,177 | 10/1962 | Ruhala et al. | 239—284 |
| 3,067,955 | 12/1962 | Heath | 239—284 X |
| 3,192,090 | 6/1965 | Sarafinas et al. | 239—284 X |
| 3,237,868 | 3/1966 | Lovell | 239—284 |

OTHER REFERENCES

Scheffler, Hellmuth: German DAS No. 1,094,131, published in December 1960.

M. HENSON WOOD, JR., *Primary Examiner.*

VAN C. WILKS, *Assistant Examiner.*